United States Patent [19]

Shinohara et al.

[11] Patent Number: 4,998,057
[45] Date of Patent: Mar. 5, 1991

[54] METHOD AND APPARATUS FOR CHARGING A BATTERY

[75] Inventors: Shigeru Shinohara; Eiji Nakayama; Shun Suzuki; Yoshio Iimura, all of Katsuta, Japan

[73] Assignee: Hitachi Koki Co., Ltd., Tokyo, Japan

[21] Appl. No.: 297,286

[22] Filed: Jan. 17, 1989

[30] Foreign Application Priority Data

Jan. 14, 1988 [JP] Japan .................................. 63-3523
Jan. 19, 1988 [JP] Japan .................................. 63-9343
Jan. 19, 1988 [JP] Japan .................................. 63-9342
Nov. 19, 1988 [JP] Japan .................................. 63-9341

[51] Int. Cl.$^5$ .............................................. H02J 7/04
[52] U.S. Cl. ......................................... 320/40; 320/20; 320/31
[58] Field of Search ................. 320/30, 31, 32, 35, 320/36, 39, 40, 48, 20

[56] References Cited

U.S. PATENT DOCUMENTS

| | | | |
|---|---|---|---|
| 3,835,362 | 9/1974 | Greene | 320/31 X |
| 3,938,021 | 2/1976 | Kosmin | 320/40 |
| 4,006,397 | 2/1977 | Catotti et al. | 320/31 |
| 4,246,529 | 1/1981 | Jurgens et al. | 320/39 |
| 4,290,109 | 9/1981 | Taniguchi et al. | 320/32 X |
| 4,354,148 | 10/1982 | Tada et al. | 320/39 X |
| 4,583,035 | 4/1986 | Sloan | 320/31 X |
| 4,712,055 | 12/1987 | Houser, Jr. | 320/35 |
| 4,746,854 | 5/1988 | Baker et al. | 320/40 |
| 4,843,299 | 6/1989 | Hutchings | 320/31 |

FOREIGN PATENT DOCUMENTS

53-43845 4/1978 Japan .
60-39325 3/1985 Japan .

*Primary Examiner*—Steven L. Stephan
*Assistant Examiner*—Kristine Peckman
*Attorney, Agent, or Firm*—Sughrue, Mion, Zinn, Macpeak & Seas

[57] ABSTRACT

In a battery charging method and apparatus, a plurality of voltage-division resistors serving as a battery voltage detecting means are connected between the battery and a microcomputer so that a voltage-division ratio can be automatically selected corresponding to the detected battery voltage. Thus, the detected battery voltage applied to the microcomputer is kept substantially constant irrespective of the value of the battery voltage.

27 Claims, 5 Drawing Sheets

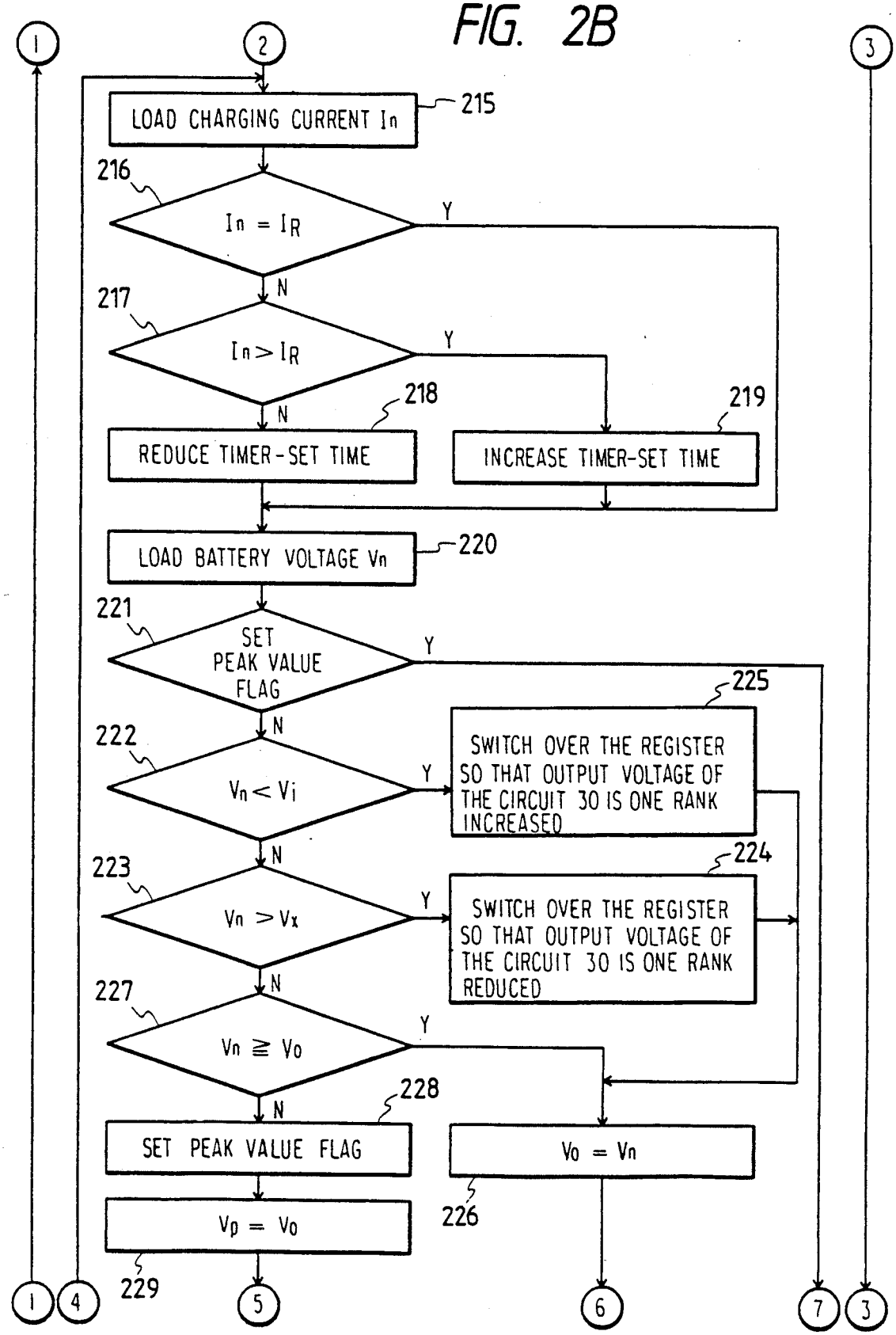

METHOD AND APPARATUS FOR CHARGING A BATTERY

BACKGROUND OF THE INVENTION

The present invention relates to a method and an apparatus for rapidly charging a battery to a predetermined level corresponding to the voltage of the battery.

Heretofore, it has been known to prevent any overcharge of a rechargeable battery by detecting a voltage drop ($-\Delta V$) which occurs when the voltage of the battery reaches a peak value upon completion of the charging and then by breaking a charging current. This will be referred to as a "$-\Delta V$ charge control method". Such a method is disclosed in U.S. Pat. No. 3,938,021 to Kosmin and Japanese Patent Publication (Examined) No. 18177/85.

While the $-\Delta V$ charge control method is advantageous in that the battery can reliably be fully charged and the battery can effectively be prevented from being broken or damaged due to overcharging, problems are involved.

Generally, it is preferable that the value of $-\Delta V$ be in the range of 10 to 20 mV per a one-cell battery for a battery voltage of 1.2 V; 20 to 40 mV in the case of a two-cell battery for a battery voltage of 2.4 V; and 100 to 200 mV in the case of a ten-cell battery for a battery voltage of 12 V. When the value of $-\Delta V$ is set to a value in the range of 100 to 200 mV, while an optimum charging can be attained for the ten-cell battery, the two-cell battery results in overcharge. On the other hand, when the value of $-\Delta V$ is set to a value in the range of 20 to 40 mV, while an optimum charging can be attained for the two-cell battery, the ten-cell battery results in undercharge. That is, with a fixed value of $-\Delta V$, some batteries are either overcharged or undercharged depending on the battery voltage.

With another charging method in which a charge termination signal is issued while monitoring the battery voltage with a microcomputer, the following problems are encountered.

If the battery voltage is applied to the microcomputer via resistors for a voltage division and also via an A/D converter, the value of $-\Delta V$ is small, say about 10 to 20 mV per a one-cell battery, so that the value of $-\Delta V$ cannot be discriminated if the battery voltage is further dropped due to the voltage division when applying to the A/D converter. For example, when charging a battery of two to ten cells (2.4 to 12 V), if the battery voltage is divided to one-third by the resistors, a voltage applied to an 8-bit converter is 0.8 V for the two-cell battery, and 4 V for the ten-cell battery. Assuming that the output of the A/D converter is [FF]$_H$ ([ ]$_H$ indicates a hexidecimal notation, and hereinafter subscript H is omitted) when the input thereto is 5 V, the output thereof is [CC] when 4 V, and [28] when 0.8 V.

The resolution power with the 8-bit converter is:

$$\frac{1}{255[FF]} \times 5 = 19.6 \, mV$$

That is, the resolution power is 19.6 mV per one bit. The value of $-\Delta V$ of the two-cell battery is 20 to 40 mV and the voltage applied to the A/D converter is 6.7 to 13.3 mV, so that $-\Delta V$ is not detectable. Therefore, it is necessary to increase the value of $-\Delta V$ of the two-cell battery, alternatively it is necessary to increase the bit number of the A/D converter.

BRIEF DESCRIPTION OF THE DRAWINGS

In the drawings:

FIGS. 2(A), 2(B), 2(C), 3 and 4 are flowcharts illustrating the operation of the apparatus.

SUMMARY OF THE INVENTION

Figure 1:
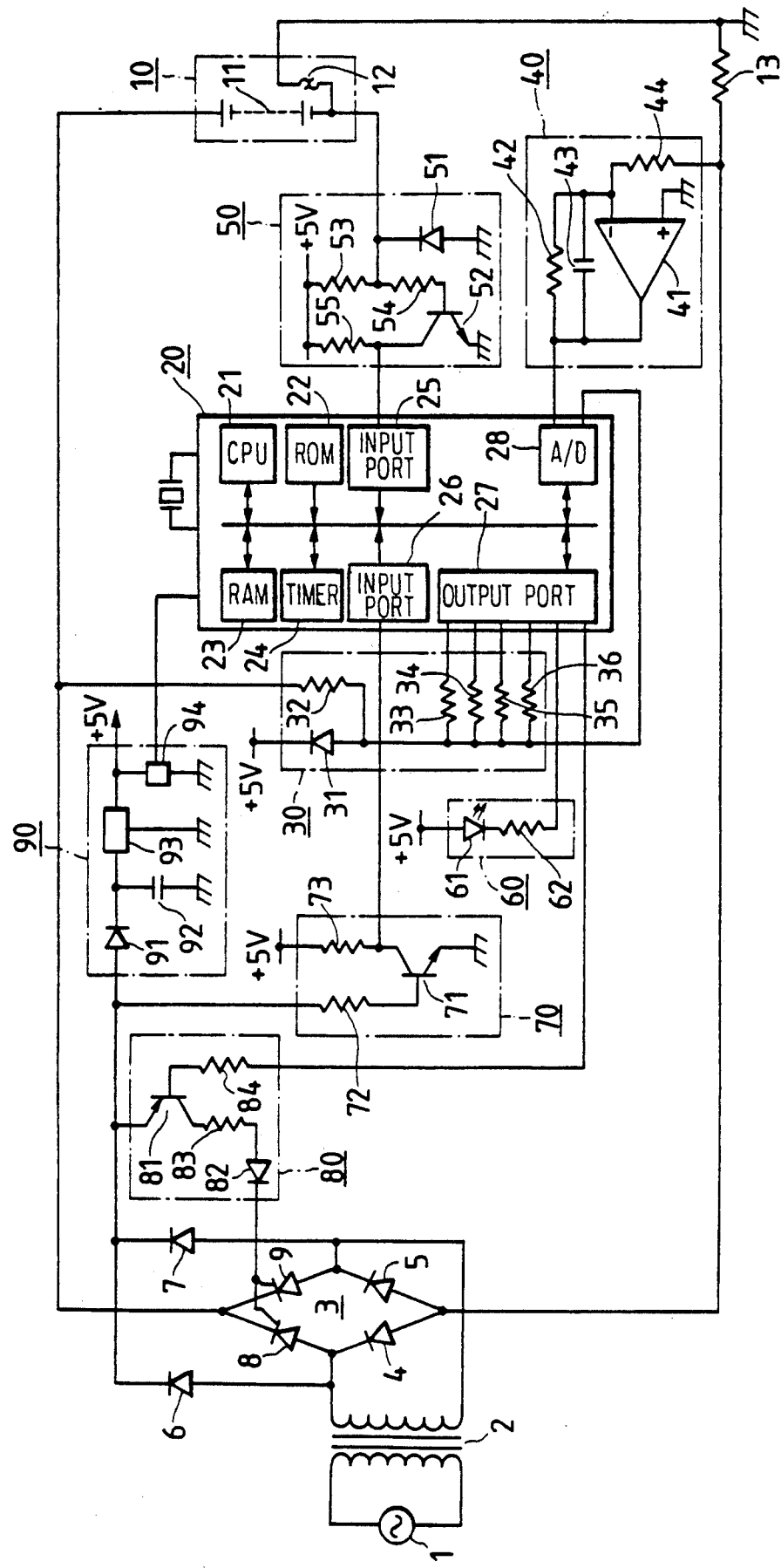
FIG. 1 is a block diagram showing a battery charging apparatus according to one embodiment of the present invention.

It is therefore an object of the present invention to provide a method and an apparatus for charging at least one rechargeable battery to a predetermined value rapidly and accurately without being overcharged or undercharged.

According to one aspect of the present invention, an apparatus is provided for charging at least one rechargeable battery, comprising:

(a) a charging current source, the battery being coupled to the charging current source;

(b) a switching device interposed between the battery and the charging current source, wherein the battery is disconnected from the charging current source when the switching device is turned off and connected to the charging current source when the switching device is turned on;

(c) a voltage detecting means for detecting a voltage developed across the battery and providing a battery voltage indicative of the voltage developed thereacross;

(d) a microcomputer operably connected to the switching device and the voltage detecting means, the microcomputer generating on- and off-signals for rendering the switching device ON and OFF, respectively, and the microcomputer receiving the battery voltage from the voltage detecting means and generating the off-signal when the battery voltage drops by a predetermined value from a peak value; and wherein the voltage detecting means includes a plurality of resistors, the battery voltage being developed across each of the resistors according to a given voltage-division ratio thereof and the microcomputer selects at least one of the resistors in accordance with the battery voltage detected by the voltage detecting means.

According to another aspect of the present invention, an apparatus is provided for charging at least one rechargeable battery, comprising:

(a) a charging current source, the battery being coupled to the charging current source;

(b) a switching device interposed between the battery and the charging current source, wherein the battery is disconnected from the charging current source when the switching device is rendered OFF and connected to the charging current source when the switching device is rendered ON;

(c) a thermostat connected in series to the battery for sensing a temperature of the battery, the thermostat having a contact which is rendered open when the temperature of the battery reaches a predetermined value and closed when the temperature of the battery is below the predetermined value;

(d) an open/closure detecting means for detecting open/closure of the contact of the thermostat, the detecting means generating a first detection signal when the contact thereof is opened and a second detection signal when the contact thereof is closed; and (e) a microcomputer operably connected to the switching device and the detecting means, for generating on- and off-signals in response to the second detection signal and applying the on- and off-signals to the switching device, the switching device being rendered ON in response to the on-signal.

According to still another aspect of the present invention, there is provided an apparatus for charging at least one rechargeable battery, comprising:

(a) a charging current source, the battery being coupled to the charging current source;

(b) a switching device interposed between the battery and the charging current source, wherein the battery is disconnected from the charging current source when the switching device is rendered OFF and connected to the charging current source when the switching device is rendered ON;

(c) a lighting indicator;

(d) a current detecting means for detecting a charging current flowing in the battery; and (e) a microcomputer operably connected to the current detecting means, the lighting indicator and the switching device, for generating on- and off-signals in response to the charging current, the switching device being rendered ON in response to the on-signal, and the microcomputer further generating a first signal for flickering the lighting indicator at a first cycle, a second signal for flickering the lighting indicator at a second cycle longer than the first cycle, and a third signal for continuously lighting the lighting indicator.

According to another aspect of the present invention, an apparatus is provided for charging at least one rechargeable battery including a charging current source, the battery being coupled to the charging current source; a switching device interposed between the battery and the charging current source, wherein the battery is disconnected from the charging current source when the switching device is rendered OFF and connected to the charging current source when the switching device is rendered on; a current detecting means for detecting a charging current flowing in the battery; and a microcomputer for generating on- and off-signals, the switching device being rendered ON for a duration determined by the on-signal. A method of charging the battery is provided comprising the steps of: generating the on-signal so that the duration is a predetermined minimum; checking whether or not the charging current detected by the current detecting means is less than a predetermined value; and prolonging the duration when the charging current is less than the predetermined value.

According to the present invention, a voltage drop by $\Delta V$ in at least one rechargeable battery is detected from the difference between a peak voltage of the battery and a relative value of the battery voltage rather than an absolute value thereof at the time of voltage drop. In the battery charging method and apparatus of the invention, the plurality of voltage-division resistors as a battery voltage detecting means is connected between the battery and the microcomputer so that a voltage-division ratio can be automatically selected corresponding to the detected battery voltage, thus keeping the input voltage of the microcomputer substantially constant, irrespective of the value of the battery voltage.

Many other objects, features and additional advantages of the present invention will become manifest to those skilled in the art upon making reference to the detailed description and the accompanying drawings in which an embodiment incorporating the principle of the present invention is shown by way of illustrative example.

DETAILED DESCRIPTION OF THE PREFERRED EMBODIMENTS

The principle of the present invention is particularly useful when embodied in a battery charging apparatus such as shown in FIG. 1. In the figure, an AC source 1 is connected to the input terminal of a first full-wave rectifier 3 through a transformer 2. The first full-wave rectifier 3 is made up of two diodes 4, 5 and two SCRs (silicon-controlled rectifiers) 8, 9, connected as shown. The output terminal of the first full-wave rectifier 3 is connected to one end of a battery unit 10. The battery unit 10 includes a plurality of rechargeable batteries 11 connected in series and a thermostat 12 connected in series to the batteries 11. The thermostat 12 has a contact which is normally closed but is opened when the temperature sensed from the batteries 11 has reached a predetermined value.

A voltage detecting circuit 30 is provided to detect the voltage developed across the batteries 11 and applies the resultant voltage to a microcomputer 20. The microcomputer 20 includes, as is well known in the art, a CPU 21, a ROM 22, a RAM 23, a timer 24, an input port 25, an interrupt input port 26, an output port 27, and an A/D converter 28, all of which are interconnected via a bus. The voltage detecting circuit 30 includes a diode 31 and resistors 32 through 36. The diode 31 has a cathode connected to the output of a constant voltage source 90 (to be described later) and the resistor 32 has one end connected to the battery unit 10 and another end connected to both the anode of the diode 31 and the A/D converter 28. Each of the resistors 33 through 36 has one end connected to a juncture point of the resistor 32 and the diode 31, and another end connected to ground through the output port 27. The output port 27 switches-over the resistors 33 through 36 so that at least one of them is selectively connected thereto. Thus, the voltage across the batteries 11 is developed across the serial connection of the resistor 32 and the selected resistor or resistors connected to ground, and the voltage developed across the latter selected resistor or resistors is applied to the A/D converter 28 provided inside the microcomputer 20.

A thermostat-contact on/off discriminating circuit 50 is provided between the battery unit 10 and the microcomputer 20 so that an on/off status data of the thermostat contact is supplied to the input port 25 of the microcomputer 20. The discriminating circuit 50 includes a diode 51, an NPN transistor 52 and resistors 53 through 55. The diode 51 has an anode connected to ground and a cathode connected to both the thermostat 12 and a juncture point between the resistors 53 and 54 connected in series. The transistor 52 has a base connected to the resistor 54, an emitter connected to ground and a collector connected to the resistor 55. The resistors 53 and 55 are further connected to the output of the constant voltage source 90. A juncture point between the collector of the transistor 52 and the resistor 55 is connected to the input port 25. The discrimination circuit 50 arranged as described above provides a signal of logical value "1" to the input port 25 when the thermostat contact is closed whereas it provides a signal of logical value "0" thereto when the thermostat contact is opened.

A current detecting resistor 13 is connected to another end of the battery unit 10 to detect a current flowing through the battery unit 10 and a voltage developed thereacross is applied through an integration circuit 40 to the A/D converter 28. The integration circuit 40 includes an operational amplifier 41, a capacitor 43, and two resistors 42, 44. The non-inverting input terminal of the operational amplifier 41 is grounded and the inverting input terminal thereof is connected through the resistor 44 to the current detecting resistor 13. Parallel-connected resistor 42 and the capacitor 43 are connected between the output terminal of the operational amplifier 41 and the inverting input thereof to provide a feedback loop. The output of the operational amplifier 41 is connected to the A/D converter 28. The integration circuit 40 serves to apply to the A/D converter 28 a voltage corresponding to a mean value of the charging currents.

A zero-cross detecting circuit 70 is provided between the interrupt port 26 and a full-wave rectifier composed of diodes 6, 7 together with the diodes 4, 5, in which a signal of logical value "1" is produced whenever the AC source 1 is zero-crossed. The zero-cross detecting circuit 70 includes an NPN transistor 71 and two resistors 72, 73. The transistor 71 has a base connected to one terminal of the resistor 72, the other terminal of which is connected to the cathodes of the diodes 6, 7. The emitter of the transistor 71 is connected to ground and the collector thereof is connected through the resistor 73 to the output of the constant voltage source 90. The logical "1" signal produced from the zero-cross circuit 70 is applied to the interrupt port 26 to thereby start implementation of an interrupt routine.

A display circuit 60 is provided to indicate the charging state, which includes an LED (light emitting diode) 61 and a resistor 62 connected in series. The LED 61 is connected to the output of the constant voltage source 90 and the resistor 62 is connected to the output port 27.

An SCR firing circuit 80 is provided between a second full-wave rectifier composed of diodes 4, 5, 6 and 7 and the gates of the SCRs 8, 9 for triggering the latter in response to the output from the output port 27. The firing circuit 80 includes a PNP transistor 81, a diode 82 and two resistors 83 and 84. The transistor 81 has an emitter connected to the cathodes of the diodes 6, 7, a base connected to one terminal of the resistor 84, to the other terminal of which the output port 27 is connected, and a collector connected through the resistor 83 to the anode of the diode 82. The cathode of the diode 82 is connected to the gates of the SCRs 8, 9.

The constant voltage source 90 is connected to the second full-wave rectifier to supply a constant voltage (5 V) to the microcomputer 20, the integration circuit 40, discriminating circuit 50, the display circuit 60 and to the zero-cross detecting circuit 70, as mentioned above. The constant voltage source 90 includes a diode 91, a smoothing capacitor 92, a three-terminal voltage regulator 93 and a reset IC 94. The IC 94 sends a reset signal to the microcomputer 20 to place the latter in an initial state.

Next, the operation of the circuit thus arranged will be described with reference to flowcharts in FIGS. 2(A-C) through 4.

Figure 2A:
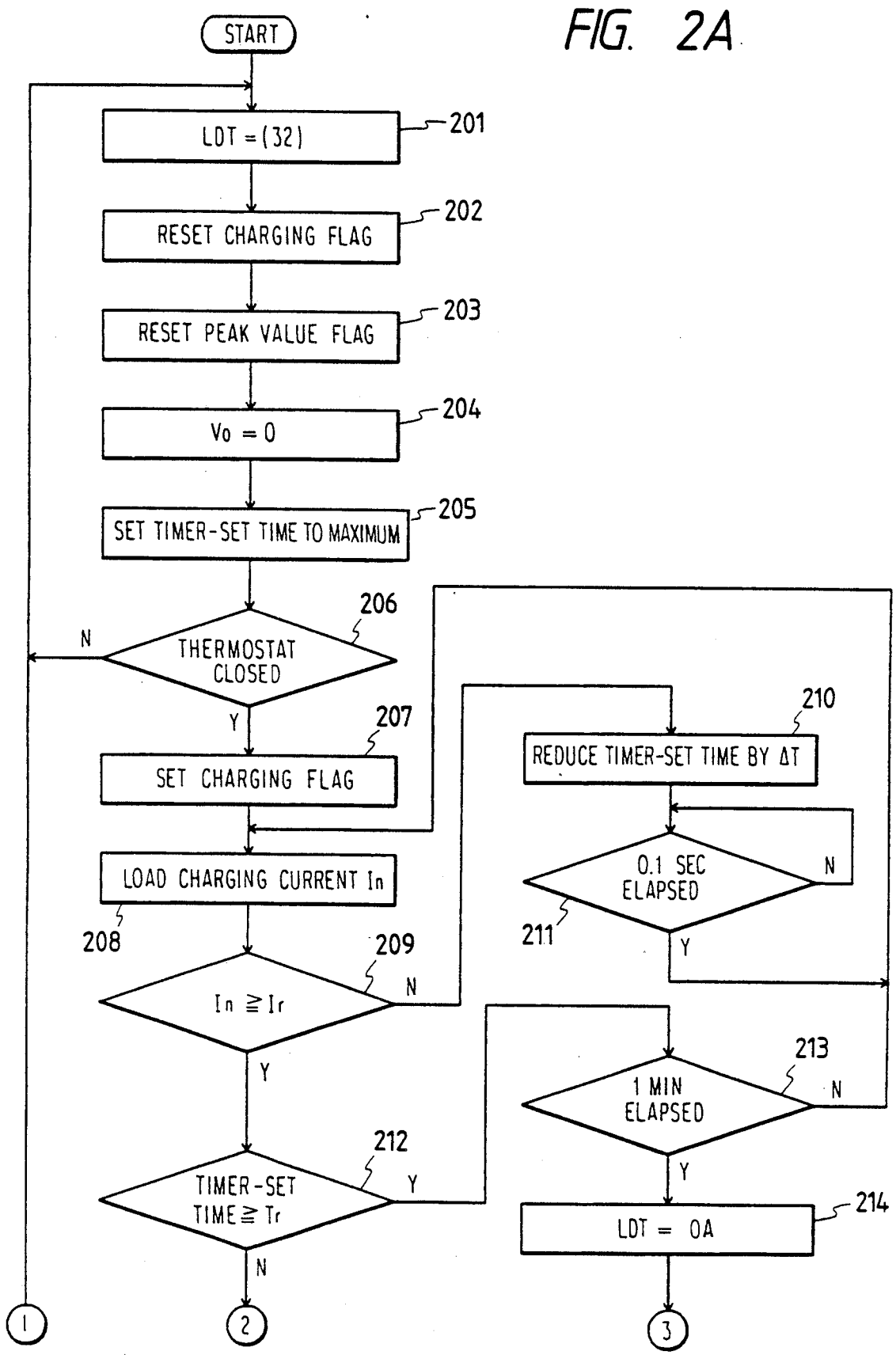
Figure 2C:
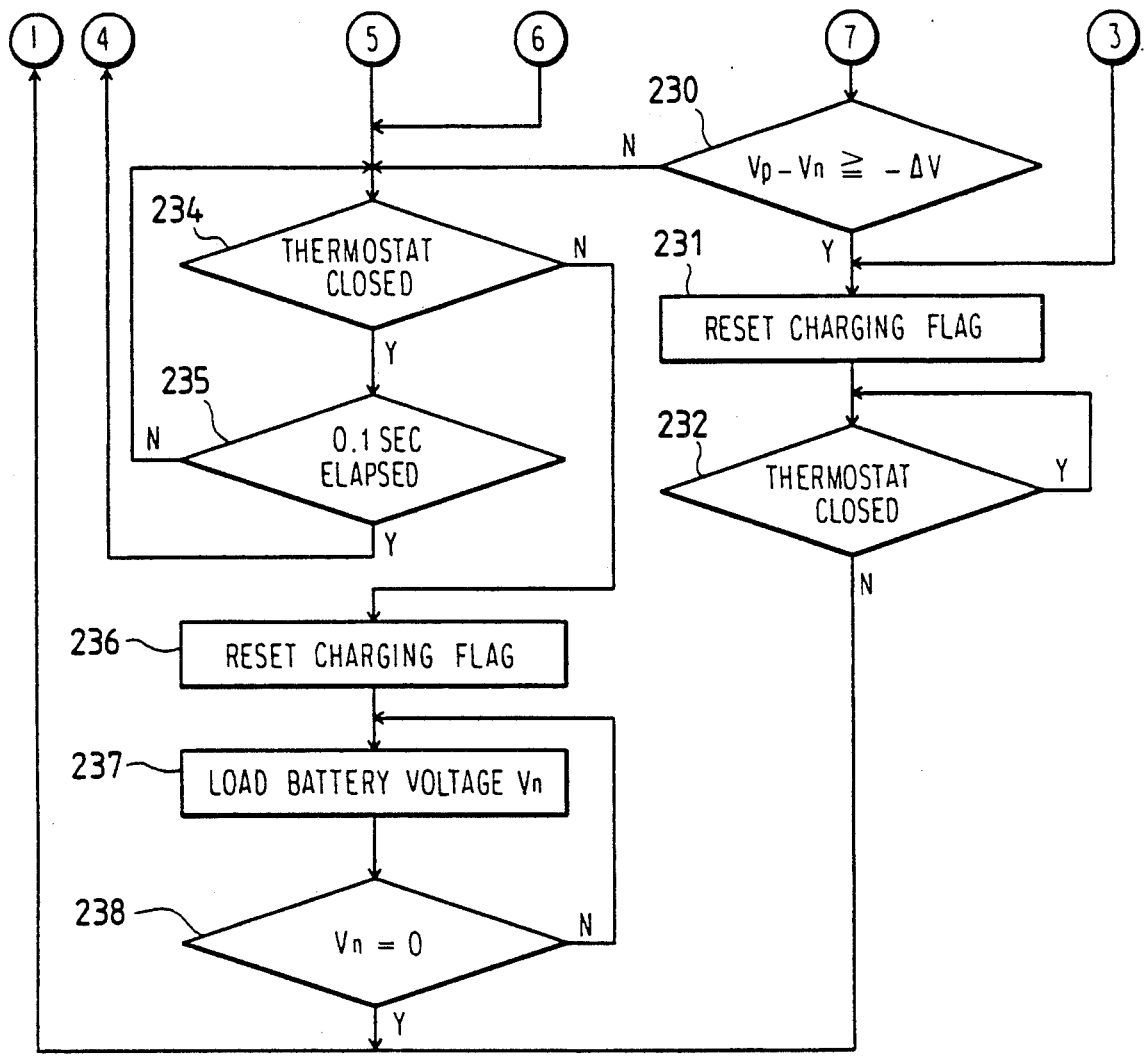

Referring to FIGS. 2(A), 2(B), 2(C), when the battery unit 10 is coupled to the charging apparatus, a load value LDT is set to [32] in a counter which determines a turn-on time and turn-off time of the LED 61 (step 201). In step 202, a charging flag indicative of a charging status is reset, and in step 203 a peak value flag is reset which indicates that the battery voltage has reached a peak value. In step 204, a battery voltage data $V_O$ is set to an initial value "0". In step 205, a time value is set to the timer at a maximum and is stored in the RAM 23. The time thus set to the timer determines a timing at which a firing signal is generated for triggering the SCRs 8, 9. The time set to the timer is a time interval from the time instant at which the zero-cross point is detected by the zero-cross detecting circuit 70 until the time instant at which the firing signal is generated. Setting this time at the maximum value means setting a conduction angle of each of the SCRs 8, 9 to a minimum. Given that the conduction angles of the SCRs 8, 9 are set to the minimum at the start of charging, it is possible to prevent any flow of the over-charging current and hence also possible to prevent the charging apparatus from being broken or damaged due to the overflow of the charging current even in the case of charging a short-circuited or an over-discharged battery.

In step 206, the CPU 21 checks whether or not the contact of the thermostat 12 is closed, namely, whether or not the battery unit 10 is connected. If the battery unit 10 is connected, the charging flag is set in step 207. Unless otherwise, step 206 is cyclically executed until the battery unit 10 is connected.

Figure 3:
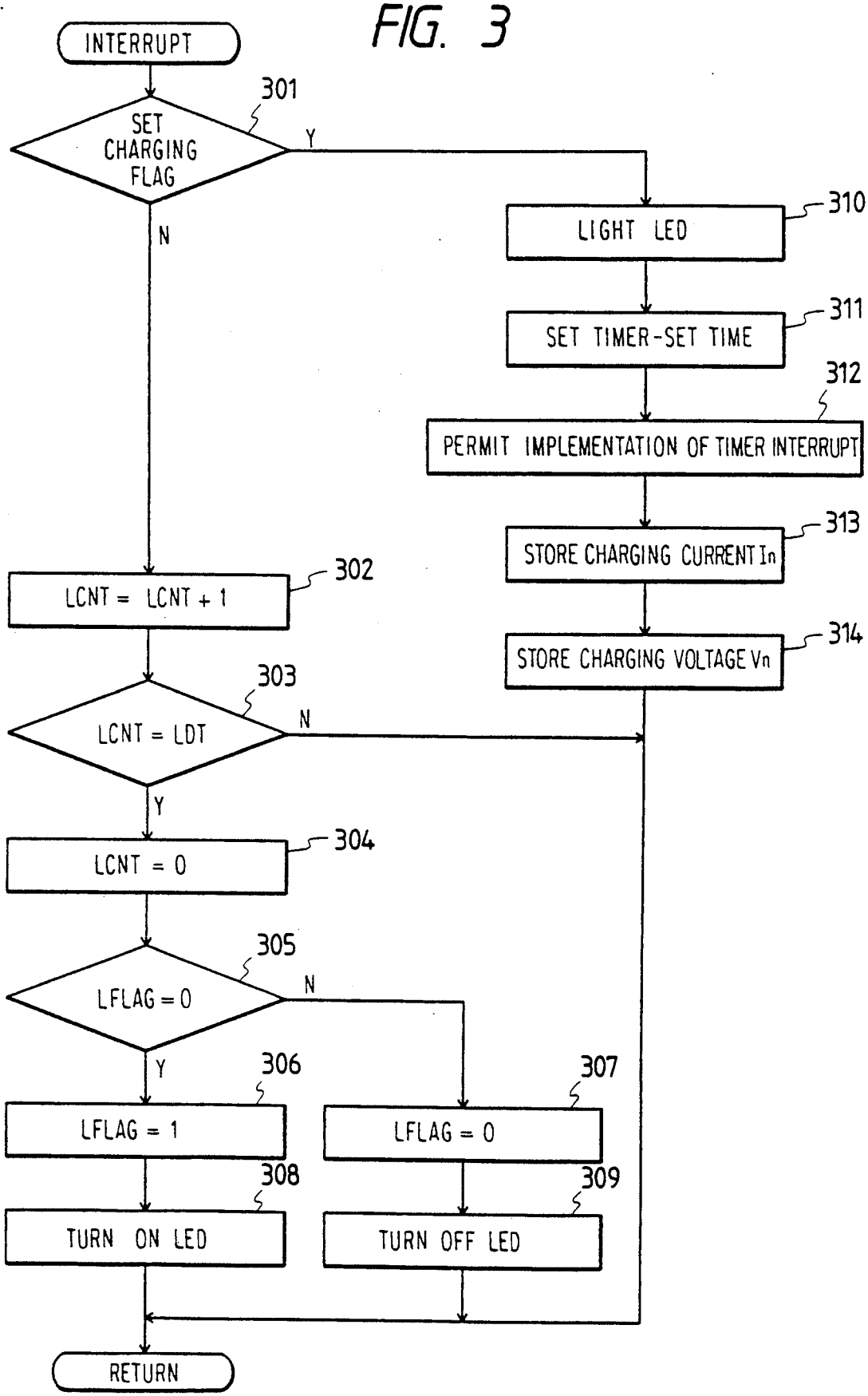

Implementation of an interrupt routine is commenced at a time when the zero-cross point is detected by the zero-cross circuit 70. A flowchart of the interrupt routine is illustrated in FIG. 3. In FIG. 3, as the interrupt routine starts, in step 301, the CPU 21 checks whether or not the charging flag is set. If the decision made in step 301 results in YES, the LED 61 is lit to indicate that the batteries 11 are in the course of charging (step 310). If the charging flag is not set, the routine proceeds to step 302 where a counter LCNT carrier out up-counting one by one whenever a zero-cross signal is issued (step 302). In step 303, the CPU 21 checks whether or not the number in the counter LCNT is in coincidence with the value LDT.

If LCNT is equal to LDT, the counter LCNT is cleared in step 304. If LCNT is not equal to LDT, the routine returns to the flowchart shown in FIG. 2. In step 305, the CPU 21 checks whether or not a flag LFLAG is set (1). If the flag LFLAG is set (1) indicating that the LED 61 is being lit, the routine proceeds to step 307 where the flag LFLAG is reset (0). In step 309, the LED 61 is turned off, whereupon the routine returns to the flowchart shown in FIG. 2. If, on the other hand, it is checked that the LED 61 is in off state (LFLAG=0), the routine proceeds to step 306 where the flag LFLAG is set (1). In step 308, the LED 61 is lit, whereupon the routine returns to the flowchart shown in FIG. 2. As mentioned previously, LDT has been set to [32] which corresponds to "50" in dirmal notation. With the AC source 1 of 50 Hz, the zero-cross signal occurs at every 10 milliseconds, so that the count value in the counter LCNT is in coincidence with the value of LDT at every 0.5 second. Therefore, the LED 61 flickers in a cycle of one second or is alternately turned on and off at every 0.5 seconds to thereby indicate that the charging apparatus is ready for charging. The LED 61 is also turned on and off upon completion of charging as will be described below.

In step 311, the time set to the timer as stored in the RAM 23 in step 205 as well as in steps 210, 218, 219 is read out thereof and is set in the timer 24. In step 312, the CPU 21 permits a timer interrupt routine illustrated in FIG. 4 to be implemented. In step 313, the charging current In from the A/D converter 28 is stored in RAM 23, and in step 314, a battery voltage Vn from the A/D converter 28 is also stored in RAM 23, whereupon the routine returns to the flowchart of FIG. 2. At the instance of zero-cross point at which no charging current is flowed, a correct value for the battery voltage Vn can be input to the microcomputer 20 without being adversely affected by the charging current.

Figure 4:
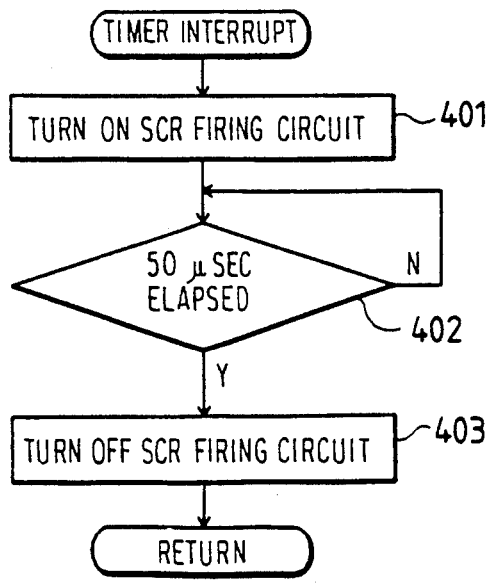

Implementation of the timer interrupt routine shown in FIG. 4 is commenced when the time set in step 311 to the timer 24 has elapsed starting from the occurrence of the zero-cross signal, whereupon in step 401, the SCR firing circuit 80 is operated. More specifically, in response to a signal from the output port 27, the firing circuit 80 generates a trigger signal and is applied to the gates of the SCRs 8, 9. In step 402, the CPU 21 checks whether or not 50 microseconds have elapsed. If elapsed, the routine proceeds to step 403 where the operation of the firing circuit 80 is turned off, whereupon the routine returns to the flowchart shown in FIG. 3. Step 402 is provided to ensure that the SCRs are triggered during 50 microseconds.

Turning back to the flowchart of FIG. 2(A) in step 208 the charging current In stored in the RAM 23 is loaded in an accumulator (not shown) provided internal to the microcomputer 20. In step 209, the charging current In is compared with a first reference value Ir. If In is greater than or equal to the reference value Ir, the routine proceeds to step 212, whereas if In is less than Ir, the routine proceeds to step 210 where the time set to the timer is reduced by $\Delta t$ so as to increase the conduction angles of the SCRs 8, 9. In step 211, the CPU 21 checks whether or not 0.1 second has elapsed. If elapsed, the routine returns to step 208. Since the charging current is increased in stepwise manner at every 0.1 second, the charging proceeds gradually.

In step 212, the CPU 21 checks whether or not the time set to the timer is equal to or greater than a reference time Tr. If affirmative, the routine proceeds to step 213 whereas if negative, the routine proceeds to step 215. In step 213, the CPU 21 checks whether or not 1 minute has elapsed. If affirmative, the routine proceeds to step 214 where the counter load value LDT is set to [0A], and if negative, the routine returns to step 208. After execution of step 214, the routine proceeds to step 231 where the charging flag is reset, in which case step 302 shown in FIG. 3 is executed to flicker the LED 61 in the cycle of 0.2 second, thereby indicating that the batteries 11 are short-circuited. That is, since [0A] corresponds to 10 in decimal notation, the counter LCNT is in coincidence with the value LDT at every 0.1 second. As a result, the LED 61 is alternately turned on and off at every 0.1 second, i.e. in a cycle of 0.2 second.

Steps 208 through 211 are for the gradual start charging control routine, in which the conduction angle of each of the SCRs 8, 9 is increased progressively to thereby prevent a flow of any large charging current at the start of charging. Further, steps 209, 212 and 213 are for the routine to detect whether the batteries 11 are damaged or not. If the charging current In is larger than the reference value Ir notwithstanding the fact that the time set to the timer is larger than the reference value Tr, i.e. the conduction angle of each of the SCRs 8, 9 is small, it is determined that the batteries 11 are short-circuited. The reason for monitoring a 1 minute period of time is to discriminate the overdischarged batteries from those short-circuited, since the battery voltage of the overdischarged batteries increases to a predetermined value and the charging current is made small if such batteries are charged for the duration of about 1 minute.

The charging current value In is loaded in the accumulator in step 215 and is compared with a second reference value IR (IR>Ir). If In is equal to IR, the routine proceeds to step 220 whereas if In is greater than Ir, the routine proceeds to step 219 to increase the time set to the timer so as to reduce the conduction angle of the SCRs 8, 9. Reversely, if In is less than IR, the routine proceeds to step 218 where the time set to the timer is reduced so as to increase the conduction angle of the SCRs 8, 9. Steps 215 through 219 are for a constant current charging control routine in which the charging current is regulated to a constant value.

In step 220, the battery voltage Vn is loaded in the accummulator, whereupon the routine proceeds to step 221 where the CPU 21 checks whether or not the peak value flag is set. If the peak value flag has been set, the routine proceeds to step 230 whereas if the peak value flag is not set, the routine proceeds to step 222 where the battery voltage Vn is compared with a minimum battery voltage Vi. If Vn<Vi, the routine proceeds to step 225 where switch-over of the resistors 33 through 36 is effectuated to increase the output voltage of the voltage detecting circuit 30 to one higher step or rank. If Vn is equal to or greater than Vi, the routine proceeds to step 223 where the battery voltage Vn is compared with the maximum battery voltage Vx. If Vn>Vx, the routine proceeds to step 224 where switch-over of the resistors 33 through 36 is effectuated to decrease the output voltage of the voltage detecting circuit 30 to one lower step or rank. After executions of steps 224 and 225, the routine advances to step 226 where the battery voltage $V_O$ is replaced by the battery voltage Vn. However, in step 223, if Vn is equal to or less than Vx, the routine proceeds to step 227. Steps 222 through 225 are for executing a voltage-division resistor selecting routine in which a most suitable one is selected from the resistors 33 through 36 commensurate with the voltage of the batteries 11 being charged, thus improving the resolution power.

In step 227, the battery voltage Vn is compared with the battery voltage data $V_O$. If Vn is equal to or greater than $V_O$, the routine proceeds to step 226 where the battery voltage data $V_O$ is replaced by the battery voltage Vn. If, on the other hand, Vn is less than $V_O$, the routine proceeds to step 228 where the peak value flag is set. Thereafter, the routine proceeds to step 229 where the battery voltage data $V_O$ is set to the peak value Vp.

Steps 226 through 229 are the routine for monitoring as to whether the detected battery voltage Vn reaches the peak value or not. That is, the previously detected and replaced battery voltage data $V_O$ is compared with the presently detected battery voltage flag. If the battery voltage Vn is smaller than $V_O$, the battery voltage data $V_O$ is set to the peak value Vp.

Step 230 is for checking whether there is a battery voltage drop $-\Delta V$ or not. If there is a battery voltage drop, the routine proceeds to step 231 to reset the charging flag. If there is no battery voltage drop, then the routine proceeds to step 234. Specifically, step 230 is executed by checking whether the battery voltage is dropped from a bit value corresponding to the peak value Vp by more than a predetermined bit digit, e.g. 2 bits. In step 231, if the charging flag is reset, the routine is not allowed to proceed to steps 310 through 314 in the flowchart of FIG. 3 so that the timer interrupt routine of FIG. 4 is not commenced. As a result, the SCRs 8,9 are not turned on to automatically terminate the charging. Like the state in which the apparatus is ready for charging, the LED 61 flickers in the cycle of 1 second in steps 301 through 309 to indicate that the charging has been completed. In step 232, it is checked whether or not the contact of the thermostat 12 is closed. If it is opened, namely, if the battery unit 10 is removed, the routine returns to step 201 to thereby place the charging apparatus ready for charging another battery unit 10.

In step 234, it is checked whether or not the contact of the thermostat 12 is closed. If closed, the routine proceeds to step 235, and after 0.1 second period of time has been elapsed, the routine returns to step 215. During this 0.1 second period of time, next charging current and voltage are sampled. If the contact of the thermostat 12 is opened in step 234, the series connection of the thermostat 12 with the battery 11 is broken and SCRs 8 and 9 are turned off. In addition, the routine proceeds to step 236 where the charging flag is reset to prohibit the routine from advancing to steps 310-314, like step 231. Steps 234 and 235 are for the routine to prevent the batteries 11 from being broken or damaged due to overheating before completion of the charging. Overheating would occur if the temperature of the batteries 11 reaches a temperature higher than a predetermined value. If the charging is taken place in an environment at high atmospheric temperature, the overheating is likely to occur.

In step 237, the battery voltage Vn is directly loaded in the accummulator by the A/D converter 28, and in step 238, it is checked whether or not the battery voltage Vn is zero. If it is zero, the routine returns to step 201 so as to place the apparatus ready for charging another battery unit 10. However, if Vn is not zero, the routine returns to step 237 to repeat this loop, that is, steps 237 and 238 are for checking whether the battery unit 10 is removed or not.

Now assuming that the voltage-division resistors 32 through 36 are 10, 3, 5.1, 10, 56 Kilo-Ohms and $-\Delta V$ corresponds to a voltage drop by 2 bits from a bit digit of the battery voltage peak value Vp, a nominal battery voltage, a peak value during the charging, a voltage-division ratio by the resistors, a voltage division of the peak value, and a battery voltage corresponding to $-\Delta V$, with respect to each of various battery units having a different number of cell batteries, are shown in Table below.

full charging of the battery unit reliably, thus preventing the batteries from being overcharged or undercharged.

According to the present invention, since the voltage input to the microcomputer via the voltage-division resistors of the detected battery voltage is kept substantially constant irrespective of the number of cell batteries, it is possible to represent the battery voltage with a reduced bit digit, thus causing an improved degree of resolution power. As a result, the voltage drop $-\Delta V$, namely, the full charging of the battery unit can be detected accurately. Further, since the voltage drop $-\Delta V$ depends upon the battery voltage, i.e. the number of the cell batteries, it is possible to prevent the batteries from being overcharged or undercharged.

Another advantage provided by the present invention is that since the stand-by state for charging, completion of charging, and troubled batteries are indicated by flickering a common LED in different cycles or by continuous lighting of the LED, it is possible to reduce the number of indicator elements to a minimum. With such mode of indication, the operator can readily recognize the indicating condition.

Further, since the value of the charging voltage is initially small due to the gradual starting of the charging, no large current flows in the charging apparatus even if a battery being charged is overcharged or short-circuited, thus preventing the charging apparatus from being damaged due to any large current.

Moreover, since the thermostat is connected to the battery unit, it is possible to start charging the battery unit simply by connecting the latter to the apparatus, thus requiring no laborious and time-consuming operation.

What is claimed is:

1. An apparatus for charging at least one rechargeable battery, comprising:
   (a) a charging current source, at least one battery being coupled to said charging current source;
   (b) a switching device interposed between said at least one battery and said charging current source, wherein said at least one battery is disconnected from said charging current source when said switching device is turned off and connected to said charging current source when said switching device is turned on;
   (c) a voltage detecting means for detecting a voltage developed across said at least one battery and providing a battery voltage indicative of the voltage developed thereacross;
   (d) a microcomputer operably connected to said

TABLE

| NUMBER OF CELLS | NOMINAL BATTERY VOLTAGE (V) | PEAK VOLTAGE AT THE TIME OF CHARGING (V) | VOLTAGE-DIVISION RATIO | DIVIDED PEAK VOLTAGE (V) | BATTERY VOLTAGE CORRES. TO - V (mV) |
|---|---|---|---|---|---|
| 2 | 2.4 | 3.1 | 56/66 | 2.63 | 46.2 |
| 4 | 4.8 | 6.2 | 10/20 | 3.1 | 78.4 |
| 6 | 7.2 | 9.2 | 5.1/15.1 | 3.11 | 116.1 |
| 8 | 9.6 | 12.3 | 3/13 | 2.84 | 169.9 |
| 10 | 12.0 | 15.4 | 3/13 | 3.55 | 169.9 |

As is seen from the Table, since the peak value of the battery voltage inputted to the A/D converter 28 is within a reduced range of 2.63 to 3.55 V, only a small bit digit would suffice. Further, since the battery voltage corresponding to $-\Delta V$ varies commensurate with the number of cell batteries and reaches a value substantially corresponding to $-\Delta V$, it is possible to detect the switching device and said voltage detecting means, said microcomputer generating on- and off-signals for rendering said switching device ON and OFF, respectively, and said microcomputer receiving said battery voltage from said voltage detecting means and generating said off-signal when said battery voltage drops by a first predetermined value from a peak value; and wherein said voltage detecting means includes a plurality of resistors, and wherein said battery voltage is developed across each of said resistors according to a given voltage-division ratio thereof and said microcomputer selects at least one of said resistors in accordance with said battery voltage detected by said voltage detecting means whereby an input voltage to said microcomputer is maintained substantially constant.

2. An apparatus according to claim 1, wherein a resistor of a larger voltage-division ratio is selected as said battery voltage becomes smaller.

3. An apparatus according to claim 1, wherein said microcomputer selects said at least one resistor after said at least one battery has been charged for a predetermined period of time.

4. An apparatus according to claim 3, further comprising a thermostat connected in series with said at least one battery for sensing a temperature of said at least one battery, said thermostat having a contact which is rendered open when the temperature of said at least one battery reaches a second predetermined value and closed when the temperature of said at least one battery is below said second predetermined value, wherein said microcomputer generates said on-signal when said contact is closed.

5. An apparatus according to claim 4, further comprising an open/closure detecting means for detecting open/closure of said contact of said thermostat, said open/closure detecting means generating a first detection signal when said contact thereof is opened and a second detection signal when said contact thereof is closed, wherein said microcomputer generates said on-signal in response to said second detection signal.

6. An apparatus according to claim 5, further comprising a light indicator, a current detecting means for detecting a charging current flowing in said at least one battery, wherein said microcomputer is further connected to said current detecting means and said light indicator and generates said on-signal in response to said charging current, and said microcomputer further generates a first signal for flickering said light indicator at a first cycle, a second signal for flickering said light indicator at a second cycle longer than said first cycle, and a third signal for continuously lighting said light indicator.

7. An apparatus according to claim 6, wherein said light indicator is flickered at said second cycle when said apparatus is ready for charging and when charging has been completed.

8. An apparatus according to claim 7, wherein said light indicator is continuously lit during the charging.

9. An apparatus according to claim 6, wherein said microcomputer determines whether said at least one battery is short-circuited or overcharged based upon whether a charging current detected after said at least one battery has been charged for said predetermined period of time is below a third predetermined value.

10. An apparatus according to claim 9, wherein said light indicator is flickered at said first cycle when said battery is determined as being short-circuited.

11. An apparatus for charging at least one rechargeable battery, comprising:

(a) a charging current source, at least one battery being coupled to said charging current source;

(b) a switching device interposed between said at least one battery and said charging current source, wherein said at least one battery is disconnected from said charging current source when said switching device is rendered OFF and connected to said charging current source when said switching device is rendered ON;

(c) a thermostat connected in series with said at least one battery for sensing a temperature of said at least one battery, said thermostat having a contact which is rendered open when the temperature of said at least one battery reaches a first predetermined value and closed when the temperature of said at least one battery is below said first predetermined value;

(d) an open/closure detecting means for detecting open/closure of said contact of said thermostat, said detecting means generating a first detection signal when said contact thereof is opened and a second detection signal when said contact thereof is closed;

(e) a plurality of resistors for detecting a voltage developed across said at least one battery and providing a battery voltage indicative of the voltage developed therefrom; and (f) a microcomputer operably connected to said switching device and said detecting means, for generating on- and off-signals in response to said second detection signal and applying said on- and off-signals to said switching device, said switching device being rendered ON in response to said on-signal, whereby an input voltage to said microcomputer is maintained substantially constant.

12. An apparatus according to claim 11, further comprising a light indicator, and a current detecting means for detecting a charging current flowing in said at least one battery, wherein said microcomputer is further connected to said current detecting means and said light indicator and generates said on-signal in response to said charging current, and said microcomputer further generates a first signal for flickering said light indicator for a first cycle, a second signal for flickering said light indicator at a second cycle longer than said first cycle, and a third signal for continuously lighting said light indicator.

13. An apparatus according to claim 12, wherein said light indicator is flickered at said second cycle when said apparatus is ready for charging and when charging has been completed.

14. An apparatus according to claim 13, wherein said light indicator is continuously lit during charging.

15. An apparatus according to claim 12, wherein said microcomputer determines whether said at least one battery is short-circuited or overcharged based upon whether a charging current detected after said at least one battery has been charged for a predetermined period of time is below a second predetermined value.

16. An apparatus according to claim 15, wherein said light indicator is flickered at said first cycle when said at least one battery is determined as being short-circuited.

17. An apparatus for charging at least one rechargeable battery, comprising:

(a) a charging current source, at least one battery being coupled to said charging current source;

(b) a switching device interposed between said at least one battery and said charging current source, wherein said at least one battery is disconnected from said charging current source when said switching device is rendered OFF and connected to said charging current source when said switching device is rendered ON;

(c) a light indicator;

(d) a current flow detecting means for detecting a charging current flowing in said at least one battery;

(e) a plurality of resistors for detecting a voltage developed across said at least one battery and providing a battery voltage indicative of the voltage developed thereacross; and (f) a microcomputer operably connected to said current detecting means, said light indicator and said switching device for generating on- and off-signals in response to said charging current, said switching device being rendered ON in response to said on-signal, and said microcomputer further generating a first signal for flickering said light indicator at a first cycle, a second signal for flickering said indicator at a second cycle longer than said first cycle, and a third signal for continuously lighting said light indicator, and wherein an input voltage to said microcomputer is maintained substantially constant.

18. An apparatus according to claim 17, wherein said light indicator is flickered at said second cycle when said apparatus is ready for charging and when charging has been completed.

19. An apparatus according to claim 18, wherein said light indicator is continuously lit during charging.

20. An apparatus according to claim 17, wherein said microcomputer determines whether said at least one battery is short circuited or overcharged based upon whether a charging current detected after said at least one battery has been charged for a predetermined period of time is below a predetermined value.

21. An apparatus according to claim 20, wherein said light indicator is flickered at said first cycle when said at least one battery is determined as being short-circuited.

22. In an apparatus for charging at least one rechargeable battery including a charging current source, at least one battery being coupled to said charging current source; a switching device interposed between said at least one battery and said charging current source, wherein said at least one battery is disconnected from said charging current source when said switching device is rendered OFF and connected to said charging current source when said switching device is rendered ON, a current detecting means for detecting a charging current flowing in said at least one battery, and a microcomputer for generating on- and off-signals, said switching device being rendered ON for a duration determined by said on-signal, a method of charging said at least one battery comprising the steps of: generating said on-signal so that said duration is a predetermined minimum; checking whether or not said charging current detected by current detecting means is less than a predetermined value; prolonging said duration when said charging current is less than said predetermined value; and maintaining an input voltage of said microcomputer at a substantially constant level.

23. An apparatus according to claim 1, wherein said switching device comprises a silicon-controlled rectifier having a gate to which said on-signal is applied.

24. An apparatus according to claim 23, wherein said charging current source comprises an AC power source for supplying an AC voltage and a full-wave rectifier coupled to said AC power source for full-wave rectifying said AC voltage, said charging current source supplying a positive voltage having a zero-cross at predetermined intervals.

25. An apparatus according to claim 24, wherein a duration of said on-signal is determined by said zero-cross point.

26. A method according to claim 22, further comprising said steps of: generating said on-signal so that the charging current becomes substantially constant when said charging current is larger than said predetermined value.

27. An apparatus according to claim 17, wherein said detecting means comprises a charging current detecting resistor connected in series to said at least one battery, and an integration circuit coupled between said resistor and said microcomputer for converting the charging current flowing in said resistor to a voltage.

* * * * *